United States Patent [19]

O'Keefe

[11] Patent Number: 5,316,525
[45] Date of Patent: May 31, 1994

[54] FULCRUM GEAR ASSEMBLY

[76] Inventor: Gerald O'Keefe, 6 Stoneybrook Dr., Williston, Vt. 05495

[21] Appl. No.: 913,242

[22] Filed: Jul. 14, 1992

[51] Int. Cl.$^5$ .............................................. F16H 3/50
[52] U.S. Cl. .................................. 475/331; 475/10; 475/338
[58] Field of Search .............. 475/252, 336, 331, 338, 475/1, 10

[56] References Cited

U.S. PATENT DOCUMENTS

| | | | |
|---|---|---|---|
| 507,695 | 10/1893 | Thomson | 475/252 OR |
| 1,296,256 | 3/1919 | Baker | 475/252 X |
| 1,613,646 | 1/1927 | Dailey | 475/10 X |
| 1,815,345 | 7/1931 | Colman | 475/363 X |
| 2,014,316 | 9/1935 | Farrell | 475/331 X |
| 2,810,844 | 10/1957 | Morrill | 475/10 X |
| 2,900,848 | 8/1959 | Henn-Collins | 475/290 X |
| 3,115,791 | 12/1963 | Dean | 475/263 X |
| 3,563,113 | 2/1971 | Harvey | 475/98 OR |
| 3,613,853 | 10/1971 | Linthicum | 475/153 X |
| 4,142,426 | 3/1979 | Baranyi | 475/338 X |
| 4,299,141 | 11/1981 | Fairchild | 475/121 OR |
| 4,641,552 | 2/1987 | Kurywczak | 475/337 OR |
| 5,171,194 | 12/1992 | Shen | 475/252 X |

Primary Examiner—Leslie A. Braun
Assistant Examiner—Daniel Wittels
Attorney, Agent, or Firm—Fishman, Dionne & Cantor

[57] ABSTRACT

A method and apparatus is presented for harnessing power or force in a gear box or engine utilizing the power unit from the fulcrum of a lever in rotary motion. In accordance with the fulcrum gear assembly of the present invention, a first input gear is rotated in one direction and a second input gear is rotated in the other direction. The forces generated by the first and second gears are combined by third and fourth gears. The combined rotary forces are transferred to an output gear providing an output available on an output shaft. The output shaft being defined as a fulcrum results in a net gain in the rotary forces. Accordingly, the output of the fulcrum gear assembly is greater than the sum of its inputs.

11 Claims, 3 Drawing Sheets

FULCRUM GEAR ASSEMBLY

BACKGROUND OF THE INVENTION

This invention relates to a fulcrum gear assembly. More particularly, this invention relates to a gear assembly which harness the power obtained from the fulcrum of a lever in a rotary motion, i.e., the fulcrum of a gear.

Various gear assemblies for transferring power are well known. U.S. Pat. Nos. 1,815,345; 2,900,848; 3,115,791; 3,563,113; 3,613,853; 4,299,141 and British Patent No. 891,041 are exemplary of prior art gear assemblies.

SUMMARY OF INVENTION

In accordance with the fulcrum gear assembly of the present invention, a first input gear is rotated in one direction and a second input gear is rotated in the other direction. The forces generated by the first and second gears are combined by third and fourth gears. The combined rotary forces are transferred to an output gear providing an output available on an output shaft. The output shaft being defined as a fulcrum results in a net gain in the rotary forces. Accordingly, the output of the fulcrum gear assembly is greater than the sum of its inputs.

The above-discussed and other features and advantages of the present invention will be appreciated and understood by those skilled in the art from the following detailed description and drawings.

DESCRIPTION OF THE DRAWINGS

Referring now to the drawings, wherein like elements are numbered alike in the several Figures.

DESCRIPTION OF THE PREFERRED EMBODIMENT

The present invention relates to a novel apparatus and method for harnessing power or force in a gear box or engine utilizing the power output from the fulcrum of a lever in rotary motion, i.e., a fulcrum gear.

Figure 1:
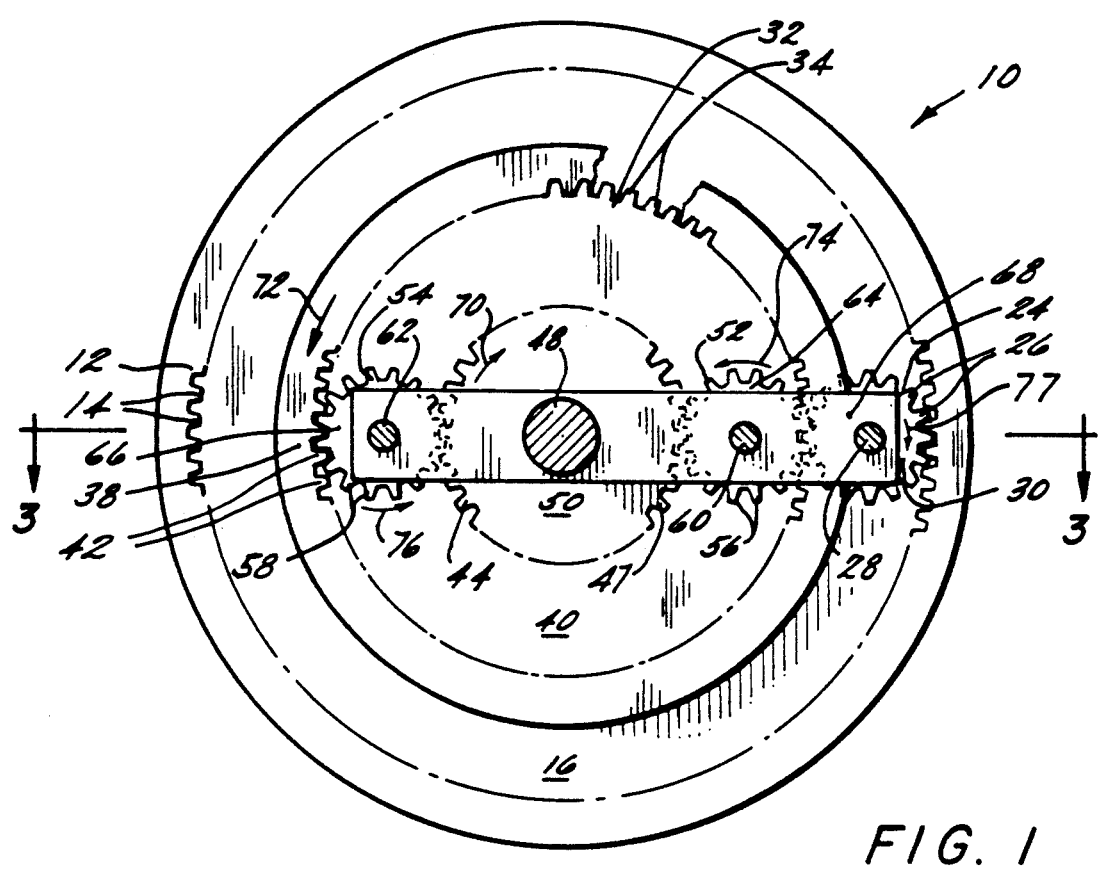
FIG. 1 is a front view of a fulcrum gear assembly in accordance with the present invention.
Figure 2:
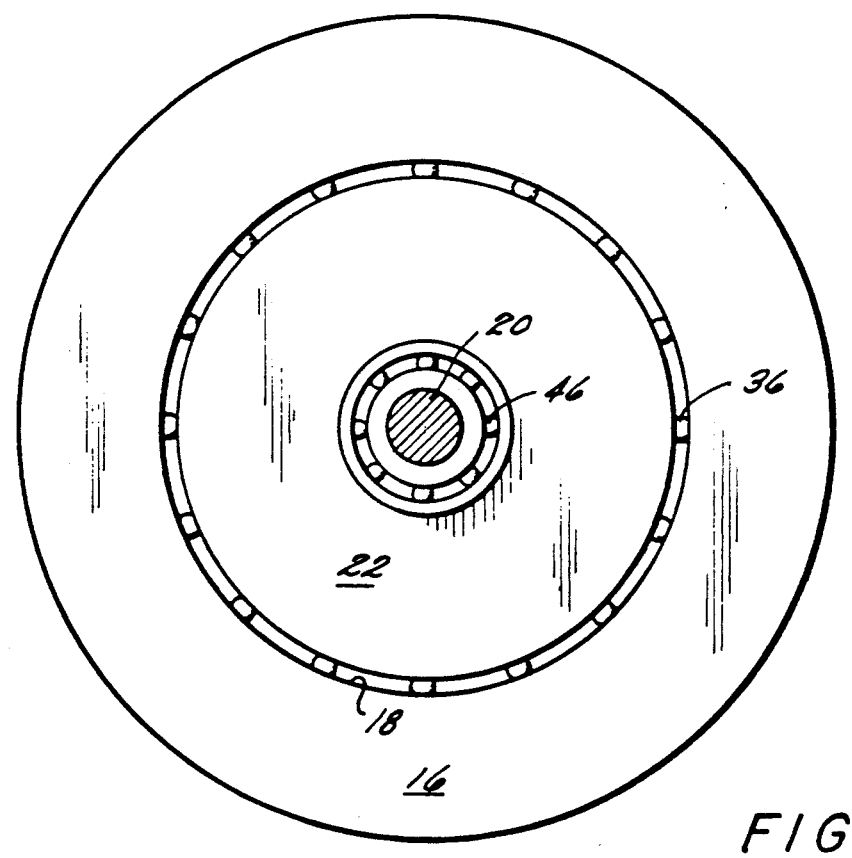
FIG. 2 is a rear view of the fulcrum gear assembly of FIG. 1.
Figure 3:
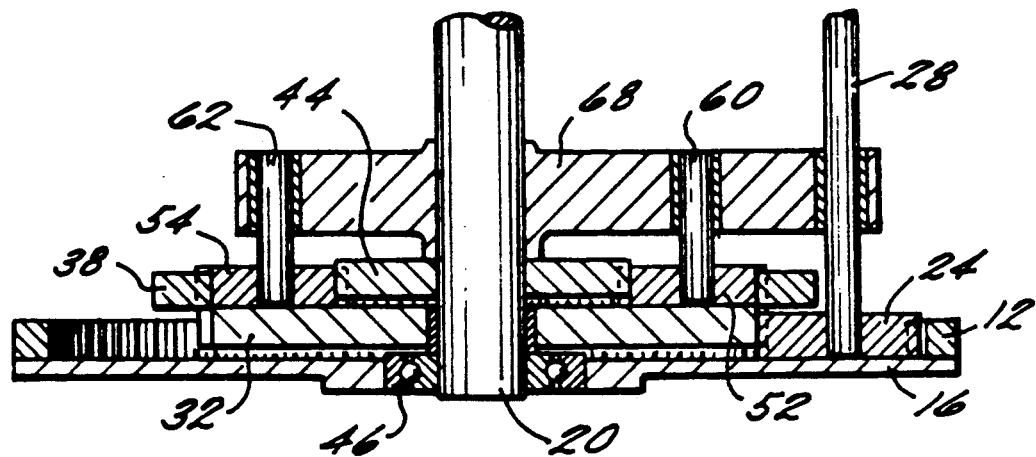
FIG. 3 is a cross-sectional elevational view of the fulcrum gear assembly of FIG. 1 along the line 3—3.

Referring now to FIGS. 1-3, a fulcrum gear assembly in accordance with a preferred embodiment is shown generally at 10. A stationary gear 12 has a plurality of gear teeth 14 extending peripheraly inward. Gear 12 is affixed to a disk 16 forming the outer periphery of assembly 10. Disk 16 has an opening 18 about the center thereof to provide access to drive shaft 20 and drive hub 22, described hereinafter.

A gear 24 has gear teeth 26 which mesh and engage with teeth 14 of gear 12. Gear 24 has a much smaller diameter than that of gear 12. Further, gear 24 has an output shaft 28 extending normally from the center of a surface 30. Gear 24 is supported on its opposite surface by disk 16. A gear 32 has gear teeth 34 which mesh and engage teeth 26 of gear 24. Drive hub 22 extends normally from a surface of gear 32. A roller bearing 36 is disposed between disk 16 and hub 22, to allow rotation of hub 22 independent of disk 16. Accordingly, gear 32 rotates independently of gear 12 allowing gear 24 to revolve therebetween. A portion of the surface of gear 32 having hub 22 is supported by disk 16.

A gear 38 is affixed at a surface 40 of gear 32 such that gear 38 rotates in unison with gear 32 and thereby in unison with drive hub 22. Gear 38 has gear teeth 42 which extend peripheraly inward.

A gear 44 is disposed at the center of surface 40. Drive shaft 20 extends normally from one surface of gear 44 through an opening at the center of gear 32 and opening 18 of disk 16. A roller bearing 46 is disposed between hub 22 and shaft 20, to allow rotation of shaft 20 independent of hub 22. Accordingly, gear 44 rotates independently of gear 38. Gear 44 has a plurality of gear teeth 47 extending peripheraly outward. Further, gear 44 has a shaft 48 extending normally from surface 50. Preferably, shaft 48 is a continuation of shaft 20, whereby gear 44 is affixed to the shaft 20, 48 for rotation in unison therewith.

Gears 52 and 54 are each disposed between gears 44 and 38. Gear 52 is directly opposite gear 54. Gears 52 and 54 each have respective gear teeth 56 and 58 which mesh and engage with teeth 47 of gear 44 and with teeth 42 of gear 38. Further, each gear 52, 54 has a corresponding shaft 60, 62 extending normally from respective surfaces 64, 66.

Shafts 28, 48, 60 and 62 are held in alignment by an element 68. Element 68 is free to rotate around shaft 48 while maintaining the required alignment of assembly 10.

Power is applied to drive shaft 20 and drive hub 22 by corresponding motors (not shown). Output power is available at shaft 28.

EXAMPLE

A 100 lb. force is applied to shaft 20 to rotate gear 44 in a clockwise direction as is indicated by arrow 70; and a 100 lb. force is applied to hub 22 to rotate gear 38 in a counter clockwise direction as is indicated by arrow 72.

Figure 4:
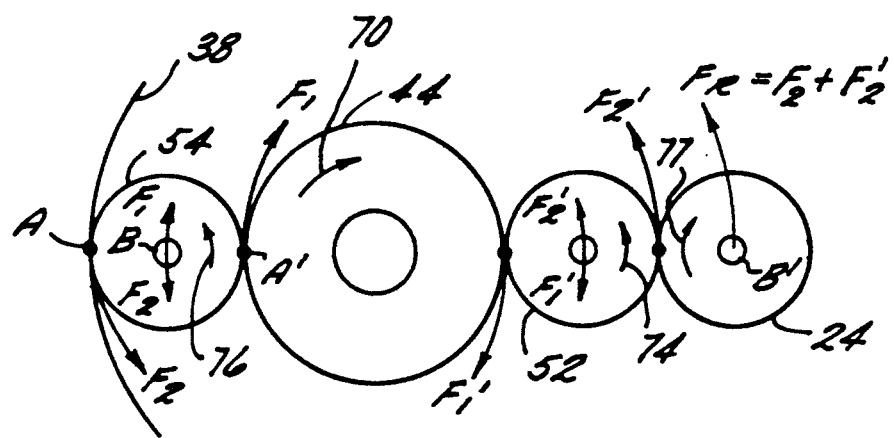
FIG. 4 is a schematic view of the fulcrum gear assembly of FIG. 1.

These forces are equal in magnitude but opposite in direction, accordingly gears 52 and 54 have equal but opposite forces applied to each with the net force on gears 52 and 54 each being zero. This can better be appreciated by referring to FIG. 4, wherein the rotation of gear 44 generates a force $F_1$, on gear 54 and the rotation of gear 38 generates an equal but opposite for $F_2$ on gear 54, whereby the net force at the center of gear 54 is zero. The same holds true for gear 52 where forces $F_1$ and $F_2$ are designated with primes. Gears 52 and 54 are rotated in a counter clockwise direction, as is indicated by respective arrows 74 and 76, by gears 38 and 40.

Accordingly, the resulting force at point A is 200 lbs., that is the 100 lbs. of force from gear 38 and the 100 lbs. of force from gear 44 transferred by gears 52 and 54.

The center of gear 24 is identified at B and a pair of oppositely disposed gear teeth are schematically shown at A—A'. In effect, the line between gear teeth A—A' is centered at B and is analogous to a lever with B defining the fulcrum of the lever. Thus, when gear 24 is rotated, (in a clockwise direction, as is indicated by an arrow 77) the lever will undergo rotary motion and point B will define a "fulcrum gear".

It will be appreciated that if a force is exerted in one direction at gear tooth A, then an opposite and equal force will be exerted at gear tooth A'. As a consequence, if force is inputted at gear tooth A, and a stop is provided at gear tooth A', the resilient output of force or power at the fulcrum gear B would be twice the input force. From the foregoing it can be seen that in this example the force $F_R$ at point B' on gear 24 is 400 lbs. (i.e., $F_R=F_2+F_2'$).

The operation of fulcrum gear assembly 10 will now be described.

In this example:

gear 44 has a 2" diameter of revolution;
gears 52 and 54 each have a 3" diameter of revolution;
gears 32 and 38 each have a 4" diameter of revolution; and
gear 24 has a 5" diameter of revolution.

One cycle of assembly 10 comprises,
2 revolutions of gear 44;
2.5 revolutions of gear 38 (note also gear 32 which rotates in unison with gear 38); and
1 revolution of gear 24.

Inches per cycle can be calculated as follows:
INPUT
gear 44;
2" revolution diameter $(\pi)=6.2832''$ per revolution, 2 revolutions/cycle (6.2832"/revolution)=12.5664"/cycle
gear 38;
4" revolution diameter $(\pi)=12.5664''$ per revolution, 2.5 revolutions/cycle (12.5664"/revolution)=31.4160"/cycle Therefore inches per cycle input is defined as: (inches/cycle of gear 44)+(inches/cycle of gear 38) 12.5664"/cycle+31.4160"/cycle=43.9824"/cycle
OUTPUT
gear 24;
5" revolution diameter $(\pi)=15.7080''$/revolution 1 revolution/cycle (15.7080"/revolution)=15.7080"/cycle The input and output power for fulcrum gear assembly 10 will now be calculated as follows:
INPUT
gear 44;
100 lbs. (12.5664"/cycle)=1,256.64 in. lbs./cycle
gear 38;
100 lbs. (31.4160"/cycle)=3,141.60 in. lbs./cycle
Therefore, total input is defined as:

---
(1,256.645 in. lbs./cycle of gear 44) +
(3,141.60 in. lbs./cycle of gear 38) =
4,398.24 in. lbs./cycle
---

OUTPUT
gear 24;
400 lbs. (15.7080"/cycle)=6,283.20 in. lbs./cycle

In accordance with the present invention a power gain of 1.4286:1 is generated (i.e., 6,283.20 in. lbs. output/4,398.24 in. lbs. input).

Figure 5:
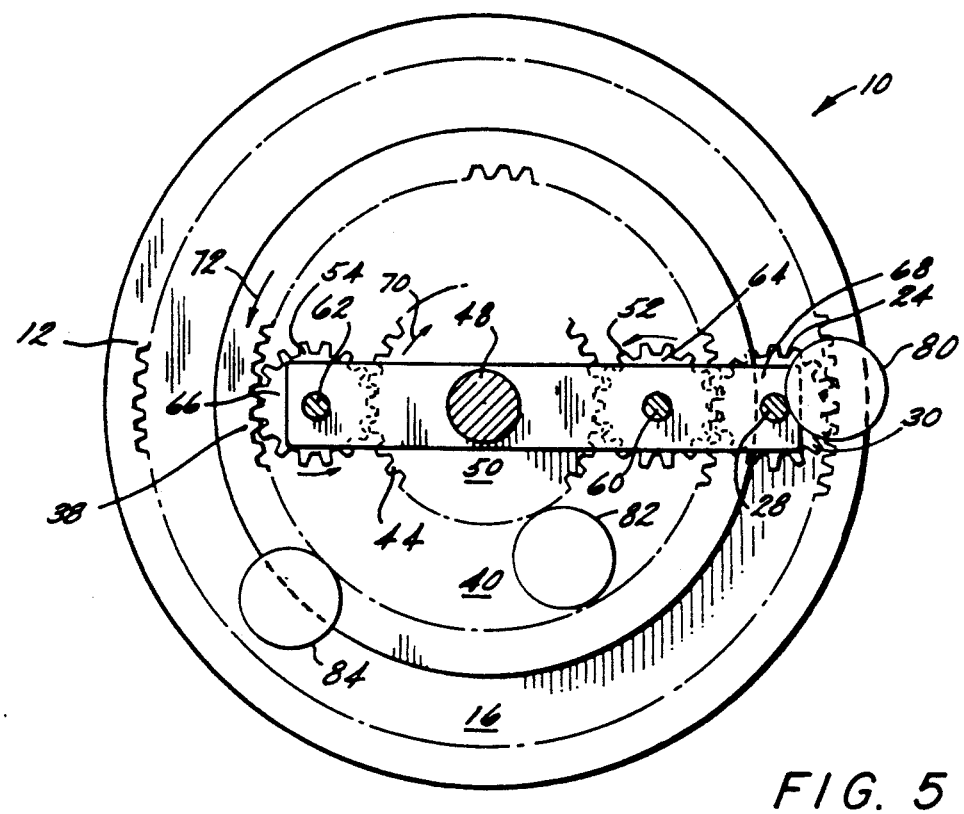
FIG. 5 is a front view of the fulcrum gear assembly of FIG. 1 employing a replication system.

In order to fully appreciate the advantages of the present invention, the fulcrum gear assembly is best employed with a replication system which is described below. Referring now to FIG. 5, a generator 80 is driven by output shaft 28. The input power is constant, i.e., 4,298.24 in. lbs./cycle as described above. Two motors 82 and 84 are powered by generator 80. The output of motor 82 is applied to gear 44 and the output of motor 84 is applied to gear 38. For purpose of illustration it will be assumed that 40% of the output power of shaft 28 is applied to motor 82 and 60% of the output power of shaft 28 is applied to motor 84. As described hereinbefore the cycle time is 0.1333 seconds. Further, losses in the generator and the motors are assumed to be negligible. The results of replication for the first two seconds of operation are set out in a table as follows:

| CYCLE | CUMULATIVE TIME (sec.) | CONSTANT INPUT (in. lbs.) | POWER OUTPUT (in. lbs.) |
|---|---|---|---|
| 1 | .1333 | 4,398.24 | 15,261 |
| 2 | .2666 | 4,398.24 | 28,091 |
| 3 | .3999 | 4,398.24 | 46,425 |
| 4 | .5332 | 4,398.24 | 72,626 |
| 5 | .6665 | 4,398.24 | 110,065 |
| 6 | .7998 | 4,398.24 | 163,367 |
| 7 | .9331 | 4,398.24 | 240,020 |
| 8 | 1.0664 | 4,398.24 | 349,272 |
| 9 | 1.1997 | 4,398.24 | 505,393 |
| 10 | 1.3330 | 4,398.24 | 728,490 |
| 11 | 1.4663 | 4,398.24 | 1,047,295 |
| 12 | 1.5996 | 4,398.24 | 1,502,868 |
| 13 | 1.7329 | 4,398.24 | 2,153,881 |
| 14 | 1.8662 | 4,398.24 | 3,084,179 |
| 15 | 1.9995 | 4,398.24 | 4,413,576 |

In view of the above discussion and examples, the present invention utilizes the force of a fulcrum gear in a rotating motion to provide a gear box wherein an output will be, for example, 1.4286:1 greater than the input. A gear box of this type i.e., which harness the power obtained from the fulcrum of the lever in rotary motion will find great utility in the gear box of an engine or transmission.

Figure 6:
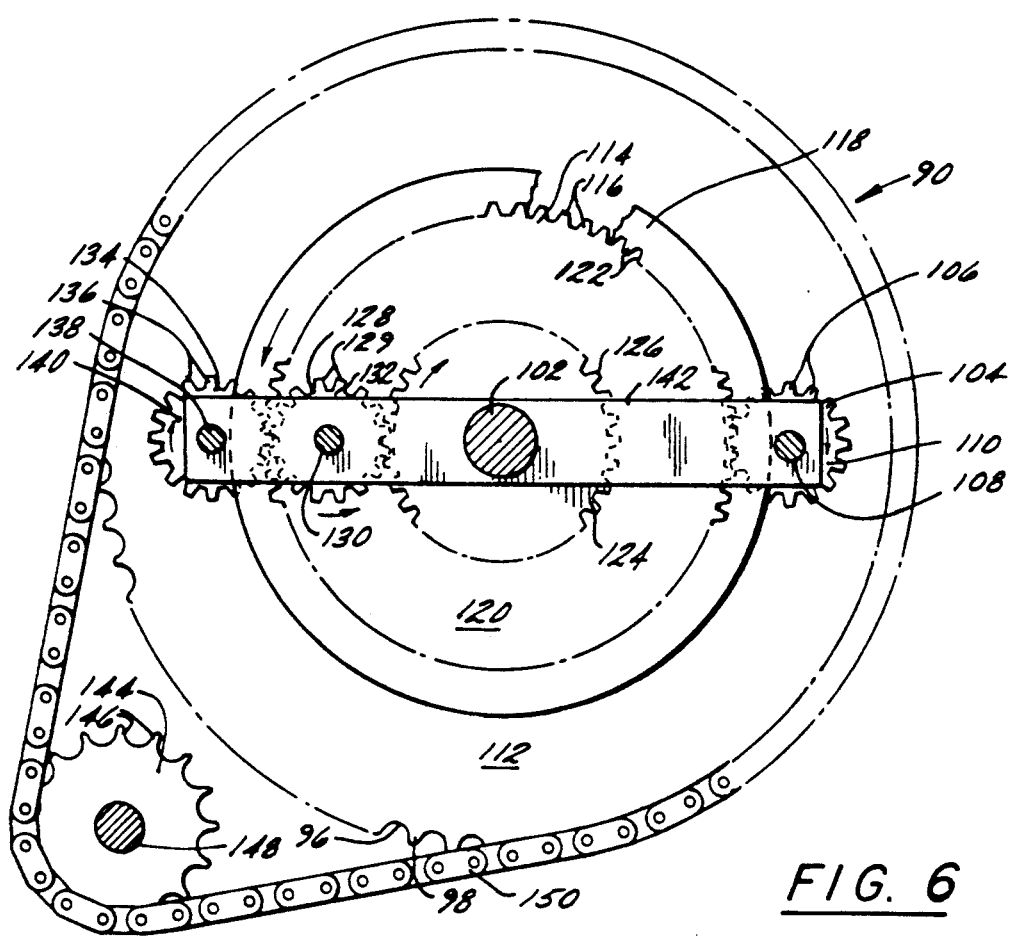
FIG. 6 is a front view of a fulcrum gear assembly in accordance with an alternate embodiment of the present invention.

Referring now to FIG. 6, a fulcrum gear assembly in accordance with an alternate embodiment is shown generally at 90. A sprocket 96 which has a plurality of sprockets 98 extending peripheraly outward. Sprocket 96 also has an opening at about the center thereof to provide access to drive shaft 102 described hereinafter.

A gear 104 has gear teeth 106 which mesh and engage with teeth 94 of gear 92. Gear 104 is rotably mounted on a shaft 108 which extends normally through about the center thereof. The lower end of shaft 108 is affixed to a surface 112 of sprocket 96 for rotation in unison therewith. A gear 114 has gear teeth 116 which mesh and engage teeth 106 of gear 104. Gear 114 rotates independently of sprocket 96 allowing gear 104 to revolve thereabout. Gear 114 may be supported at surface 112 of sprocket 96.

A gear 118 is affixed at a surface 120 of gear 114 such that gear 118 rotates in unison with gear 114. Gear 118 has gear teeth 122 which extend peripheraly inward.

A gear 124 is disposed at the center of surface 120. Drive shaft 102 extends normally from one surface of gear 124 through an opening at the center of gear 114 and the opening at the center of sprocket 96. Gear 124 rotates independently of gear 118. Gear 124 has a plurality of gear teeth 126 extending peripheraly outward. Shaft 102 extends normally from both surfaces of gear 124 and is affixed for rotation in unison therewith.

A gear 128 is disposed between gears 124 and 118. Gear 128 has a plurality of gear teeth 129 extending outwardly therefrom, which mesh and engage with teeth 126 of gear 124 and with teeth 122 of gear 118. Further, gear 128 has a shaft 130 extending normally from a surface 132. The lower end of shaft 130 is affixed to surface 112.

A gear 134 has gear teeth 136 which mesh and engage with teeth 94 of gear 92. Gear 134 is rotably mounted on a shaft 138 which extend normally through about the center thereof. The lower end of shaft 138 is affixed to surface 112 of sprocket 96 for rotation in unison therewith. Teeth 116 of gear 114 mesh and engage teeth 136 of gear 134. Gear 114 rotates independently of sprocket 96 allowing gear 134 to revolve thereabout.

Shafts 102, 108, 130 and 138 are held in alignment by an element 142. Element 142 is free to rotate around shaft 102 while maintaining the required alignment of assembly 90.

A sprocket 144 has a plurality of sprockets 146 extending peripheraly outward. A drive shaft 148 extends normally from both surfaces of sprocket 144 and is affixed for rotation in unison therewith. Sprockets 146 communicate with sprockets 98 via a chain drive 150.

Power is applied to drive shafts 102 and 148 by corresponding motors (not shown). Output power is available at shaft 148.

The operation of fulcrum gear assembly 90 will now be described.

In this example:
gear 124 has a 2" diameter of revolution;
gear 128 has a 3" diameter of revolution;
gears 114 and 118 each have a 4" diameter of revolution;
gears 104 and 134 each have a 5" diameter of revolution;
sprocket 144 has a 2" diameter of revolution; and
sprocket 96 has a 5" diameter of revolution.

One cycle of assembly 90 comprises,
2 revolutions of gear 124;
2.5 revolutions of gear 118 (note also gear 114 which rotates in unison with gear 118);
1 revolution of gear 104;
2 revolutions of sprocket 144; and
2 revolutions of sprocket 96.

Inches per cycle can be calculated as follows:
INPUT
gear 124;
2" revolution diameter ($\pi = 6.2832$" per revolution, 2 revolutions/cycle (6.2832"/revolution)=12.5664"/cycle gear 118 (whereby, chain drive 150 drives sprocket 96 which in turn drives gears 104, 134, 114 and 118 respectively); 4"revolution diameter ($\pi$)=12.5664" per revolution,
2.5 revolutions/cycle (12.5664"/revolution)=31.4160"/cycle
Therefore inches per cycle input is defined as:

(inches/cycle of gear 124)+(inches/cycle of gear 118)
12.5664"/cycle+31.4160"/cycle=43.9824"/cycle OUTPUT
gear 144;
2" revolution diameter ($\pi$)=6,2832/revolution 2.5 revolution/cycle (6,2832"/revolution)=15.7080"/cycle The input and output power for fulcrum gear assembly 90 will now be calculated as follows:
INPUT
gear 124;
100 lbs. (12.5664"/cycle)=1,256.64 in. lbs./cycle gear 118;
100 lbs. (31.4160"/cycle)=3,141.60 in. lbs./cycle
Therefore, total input is defined as:

(1,256.645 in. lbs./cycle of gear 124) +
(3,141.60 in. lbs./cycle of gear 118) =
4,398.24 in. lbs./cycle OUTPUT
gear 144;
400 lbs. (15.7080"/cycle)=6,283.20 in. lbs./cycle In accordance with the present invention a power gain of 1.4286:1 is generated (i.e., 6,283.20 in. lbs. output/4,398.24 in. lbs. input).

Fulcrum gear assembly 90 is also best employed with a replication system (as described hereinbefore). In this embodiment a generator (not shown) would be driven by shaft 148.

While the preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A fulcrum gear assembly comprising:
first input gear means having a plurality of first gear teeth along the periphery thereof;
input shaft means extending from at least one surface of said first gear means at about the center thereof, said input shaft means for rotation in unison with said first gear means;
second input gear means having a plurality of second gear teeth along the periphery thereof and having a plurality of third gear teeth along the periphery thereof opposite said second gear teeth;
input hub means extending from one surface of said second gear means, said input hub means disposed about said input shaft, said input hub means for rotation in unison with said second gear means;
third gear means having a plurality of fourth gear teeth along the periphery thereof, said third gear means disposed between said first and second gear means, wherein said fourth gear teeth mesh with said first and second gear teeth;
first alignment shaft means extending from one surface of said third gear means at about the center thereof, said first alignment shaft means for rotation in unison with said third gear means;
fourth gear means having a plurality of fifth gear teeth along the periphery thereof, said fourth gear means disposed between said first and second gear means, wherein said fifth gear teeth mesh with said first and second gear teeth, said fourth gear means being opposite said third gear means;
second alignment shaft means extending from one surface of said fourth gear means at about the center thereof, said second alignment shaft means for rotation in unison with said fourth gear means;
fifth fixed gear means having a plurality of sixth gear teeth along the periphery thereof;
sixth output gear means having a plurality of seventh gear teeth along the periphery thereof, said sixth gear means disposed between said second and fifth gear means, wherein said seventh gear teeth mesh with said third and sixth gear teeth;

output shaft means extending from one surface of said sixth gear means at about the center thereof, said output shaft means for rotation in unison with said sixth gear means; and alignment means having a channel wherein said first alignment shaft means, said second alignment shaft means and said output shaft means are disposed.

2. The fulcrum gear assembly of claim 1 further comprising:
a generator driven by said output shaft, said generator for providing at least one output signal;
a first motor responsive to said output signal, said first motor for driving said input shaft; and
a second motor responsive to said output signal, said second motor for driving said input hub.

3. The fulcrum gear assembly of claim 1 further comprising:
roller bearing means disposed between said input shaft and said input hub.

4. The fulcrum gear assembly of claim 1 further comprising:
plate means for supporting said fifth and sixth gear means.

5. A method for generating an output from a fulcrum gear assembly comprising the steps of:
rotating a first input gear in a first direction generating first rotary forces;
rotating a second input gear in a second direction generating second rotary forces, said second direction being opposite said first direction;
transferring said first rotary forces at said first gear to said second gear through third and fourth gears generating combined rotary forces, said third and fourth gears disposed between said first and second gears; and
transferring said combined rotary forces to a fifth output gear, said fifth gear having an output shaft for providing an output.

6. The method of claim 5 further comprising the step of:
replicating said output, wherein said rotating said first gear and said rotating said second gear is responsive to said output.

7. The method of claim 5 wherein said first direction is clockwise and second direction is counter clockwise.

8. The method of claim 5 further comprising the step of:
maintaining alignment of said third, fourth and fifth gears.

9. A fulcrum gear assembly comprising:
first sprocket means having opposing surfaces and a plurality of first sprockets along the periphery thereof;
second sprocket means having a plurality of second sprockets along the periphery thereof;
sprocket shaft means extending from at least one surface of said second sprocket means, said sprocket shaft means for rotation in unison with said second sprocket means;
chain drive means in communication with said first and second sprockets;
first input gear means having a plurality of first gear teeth along with the periphery thereof;
input shaft means extending from at least one surface of said first gear means at about the center thereof, said input shaft means for rotation in unison with said first gear means;

second gear means having a plurality of second gear teeth along the periphery thereof and having a plurality of third gear teeth along the periphery thereof opposite said second gear teeth;
third gear means having a plurality of fourth gear teeth along the periphery thereof, said third gear means disposed between said first and second gear means, wherein said fourth gear teeth mesh with said first and second gear teeth;
first shaft means extending from one surface of said third gear means at about the center thereof, said first shaft means for rotation in unison with said third gear means;
fourth gear means having a plurality of fifth gear teeth along the periphery thereof, said fourth gear means disposed at the periphery of said second gear means, wherein said fifth gear teeth mesh with said third gear teeth;
second shaft means extending through about the center of said fourth gear means for allowing rotation of said fourth gear means thereabout, one end of said second shaft means affixed to one of said surfaces of said first sprocket means for rotation in unison with said first sprocket means;
fifth gear means having a plurality of sixth gear teeth along the periphery thereof, said fifth gear means disposed at the periphery of said second gear means, wherein said sixth gear teeth mesh with said third gear teeth;
third shaft means extending through about the center of said fifth gear means for allowing rotation of said fifth gear means thereabout, one end said third shaft means affixed to said one of said surfaces of said first sprocket means for rotation in unison with said first sprocket means; and
alignment means having a channel wherein said first, second and third shaft means are disposed.

10. The fulcrum gear assembly of claim 9 further comprising:
a generator driven by said sprocket shaft means, said generator for providing at least one output signal;
a first motor responsive to said output signal, said first motor for driving said input shaft means; and
a second motor responsive to said output signal, said second motor for driving said sprocket shaft means.

11. A fulcrum gear assembly comprising:
first input gear means having a plurality of first gear teeth along the periphery thereof;
input shaft means extending from at least one surface of said first gear means at about the center thereof, said input shaft means for rotation in unison with said first gear means;
second gear means having a plurality of second gear teeth along the periphery thereof and having a plurality of third gear teeth along the periphery thereof opposite said second gear teeth;
third gear means having a plurality of fourth gear teeth along the periphery thereof, said third gear means disposed between said first and second gear means, wherein said fourth gear teeth mesh with said first and second gear teeth;
first alignment shaft means extending from one surface of said third gear means at about the center thereof, said first alignment shaft means for rotation in unison with said third gear means;
fourth gear means having a plurality of fifth gear teeth along the periphery thereof, said fourth gear means disposed between said first and second gear means, wherein said fifth gear teeth mesh with said first and second gear teeth, said fourth gear means being opposite said third gear means;

second alignment shaft means extending from one surface of said fourth gear means at about the center thereof, said second alignment shaft means for rotation in unison with said fourth gear means;

fifth fixed gear means having a plurality of sixth gear teeth along the periphery thereof;

sixth output gear means having a plurality of seventh gear teeth along the periphery thereof, said sixth gear means disposed between said second and fifth gear means, wherein said seventh gear teeth mesh with said third and sixth gear teeth;

output shaft means extending from one surface of said sixth gear means at about the center thereof, said output shaft means for rotation in unison with said sixth gear means; and alignment means having a channel wherein said first alignment shaft means, said second alignment shaft means and said output shaft means are disposed.

* * * * *